United States Patent
Kim

(10) Patent No.: US 10,443,844 B2
(45) Date of Patent: Oct. 15, 2019

(54) IGNITION DEVICE OF BURNER

(71) Applicant: KOVEA CO., LTD., Bucheon-si (KR)

(72) Inventor: Sang Hyun Kim, Incheon (KR)

(73) Assignee: KOVEA CO., LTD., Bucheon-si (KR)

( * ) Notice: Subject to any disclaimer, the term of this patent is extended or adjusted under 35 U.S.C. 154(b) by 161 days.

(21) Appl. No.: 15/697,937

(22) Filed: Sep. 7, 2017

(65) Prior Publication Data
US 2018/0066845 A1 Mar. 8, 2018

(30) Foreign Application Priority Data

Sep. 8, 2016 (KR) .................. 10-2016-0115421

(51) Int. Cl.
| | | |
|---|---|---|
| F23Q 3/00 | (2006.01) | |
| F24C 3/10 | (2006.01) | |
| F23Q 9/04 | (2006.01) | |
| F24C 3/08 | (2006.01) | |
| F24C 3/14 | (2006.01) | |

(52) U.S. Cl.
CPC .............. *F23Q 3/008* (2013.01); *F24C 3/103* (2013.01); *F23N 2027/36* (2013.01); *F23Q 9/04* (2013.01); *F24C 3/08* (2013.01); *F24C 3/10* (2013.01); *F24C 3/14* (2013.01)

(58) Field of Classification Search
CPC ....................................................... F23Q 3/008
USPC ............................................................ 126/11
See application file for complete search history.

(56) References Cited

U.S. PATENT DOCUMENTS

| | | | | |
|---|---|---|---|---|
| 4,719,874 A | * | 1/1988 | Maurice ................. | A01K 31/19 119/306 |
| 2013/0220301 A1 | * | 8/2013 | Saksena ................. | A47J 27/16 126/377.1 |

FOREIGN PATENT DOCUMENTS

| | | |
|---|---|---|
| JP | 2001349542 | 12/2001 |
| KR | 1020100126444 | 12/2010 |

* cited by examiner

*Primary Examiner* — Avinash A Savani
(74) *Attorney, Agent, or Firm* — Cantor Colburn LLP

(57) ABSTRACT

Provided is an ignition device of a burner which allows the burner to stably ignite even when a portion of the burner member is damaged, the ignition device including: a plate-shaped sparker disposed in an upper central region of a burner head so as to realize ignition to burn the gas ejected from the burner head and having a plurality of ignition portions formed therein; and a supporting member which has one end inserted in a center of the sparker and the other end inserted in a central region of the burner head such that the sparker is disposed in the upper central region of the burner head.

4 Claims, 5 Drawing Sheets

IGNITION DEVICE OF BURNER

TECHNICAL FIELD

The present invention relates to a burner, and more particularly, to an ignition device of a burner which allows the burner to ignite.

BACKGROUND ART

In general, portable burners are used to put a cooking container thereon outdoors as well as at home and cook food by using gas, petrol, or the like as a fuel source.

Configurations of such a portable burner are roughly divided into a type in which a fuel container is directly coupled to a body part of a burner head and a type in which the burner body and the fuel container are spaced a certain distance from each other through a connecting hose.

In addition, in a configuration in which the burner body and the fuel container are spaced a certain distance apart from each other, since the configuration is configured so that the burner head is not provided with a separate flame hole part and a fire source with high heating power may be ensured, a user generates a flame on the burner head through a separate ignition source to thereby allow the burner to ignite.

On the contrary, in a configuration in which the burner head body part and the fuel container are mounted in a direct coupling type, the burner head is provided on one side thereof with a sparker and a flame is generated while the flame generated through the sparker contacts a gas ejected through a flame hole part of the burner head, thereby allowing the burner to ignite.

FIG. 1 is an exploded perspective view in which a burner is disassembled so that an ignition device provided to a conventional burner is exposed.

As illustrated in FIG. 1, an ignition device provided to the conventional burner has a configuration in which a separate sparker 20 is installed on one side of a burner head 10 to which a gas used as fuel is supplied and from which the gas is ejected.

The sparker 20 is formed of a thin bar-shaped metal material and is bent into an "L"-shape.

In addition, an end portion of the sparker 20 is formed in a sharp shape and is disposed at a position adjacent to an outer surface of the burner head 10 from which gas is ejected, so that ignition is realized while the gas is oxidized by an instantaneous flame generated from the sparker.

However, since the sparker 20 constituting the ignition device installed on the conventional burner is formed in a thin bar-like shape and is easily broken when an external force is applied, there is a problem in that the replacement period of parts is short and the confidence of users in a product is thereby deteriorated.

Furthermore, since even a small amount of foreign substances is applied on the entire outer surface of the sparker 20, a flame is not generated from the sparker 20. Thus, in order to allow the burner to ignite, there is an inconvenient problem in that foreign substances applied on the outer surface of the sparker should be removed.

DISCLOSURE

Technical Problem

In light of the above-mentioned features, the purpose of the present invention is to provide an ignition device of a burner which allows the burner to stably ignite by using another region of an ignition member even when a portion of the ignition member, which is installed on the burner and allows the burner to ignite when the burner is used, is damaged or foreign substances are attached, and thus, the replacement period of parts may be prolonged, and user satisfaction with a product may be improved.

Technical Solution

In accordance with an exemplary embodiment, an ignition device of a burner includes: a body part having a fuel container coupled to one side thereof and a gas supply flow passage which is installed therein and through which gas contained in the fuel container is supplied; and a burner head which is disposed in an upper central portion of the body part and provides heating power by ejecting a gas supplied thereto from the fuel container through the gas supply flow passage, wherein the ignition device is characterized by including: a plate-shaped sparker disposed in an upper central region of the burner head so as to realize ignition to burn the gas ejected from the burner head and having a plurality of ignition portions formed therein; and supporting members each of which has one end inserted in a center of the sparker and the other end inserted in the central portion of the burner head such that the sparker is disposed in the upper central region of the burner head.

Here, a stopper which allows a lower surface of the sparker inserted in the support member may protrude in the radial direction of the support member on an upper outer surface of the support member.

In addition, the sparker may be formed to have a rugby ball-shaped cross-section provided on both end portions such that the ignition portions correspond to each other, and may be formed such that the side central portion thereof is inwardly recessed forward the center of the sparker.

In addition, the sparker may be formed such that the ignition portions are formed on end portions in "+"-shapes in four directions to correspond to each other, and the side surface thereof is formed to be convexly curved toward the outside.

Advantageous Effects

As described above, an ignition device of a burner in accordance with an exemplary embodiment has an effect in that the burner is allowed to stably ignite by using another region of an ignition member even when a portion of the ignition member, which is installed on the burner and allows the burner to ignite when the burner is used, is damaged or foreign substances are attached, and thus, the replacement period of parts may be prolonged, and user satisfaction with a product may be improved.

MODE FOR INVENTION

Hereinafter, an ignition device of a burner in accordance with an exemplary embodiment will be described in more detail with reference to attached drawings.

Figure 1:
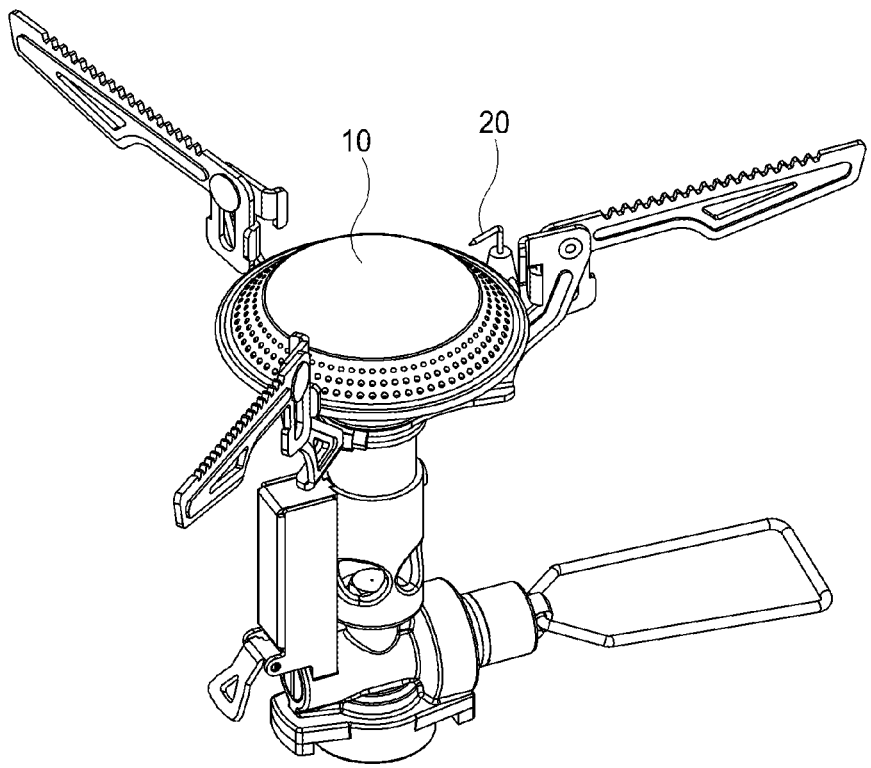
FIG. 1 is an exploded perspective view in which a burner is disassembled such that an ignition device provided to the conventional burner is exposed.
Figure 2:
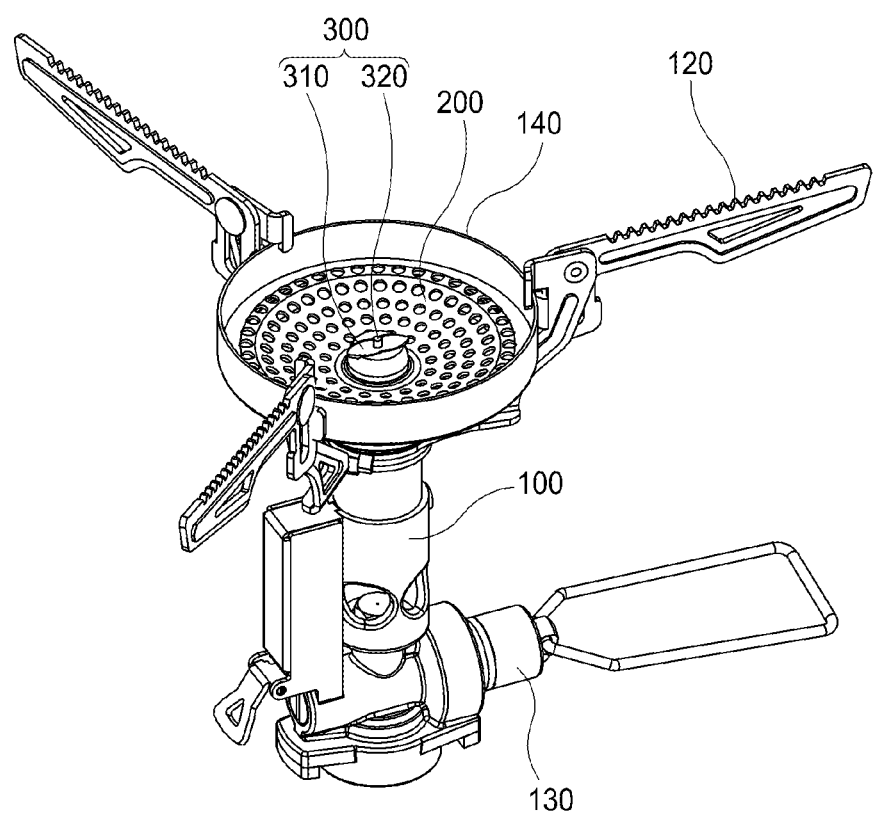
FIG. 2 is a perspective view illustrating a structure of an ignition device of a burner in accordance with an exemplary embodiment.
Figure 3:
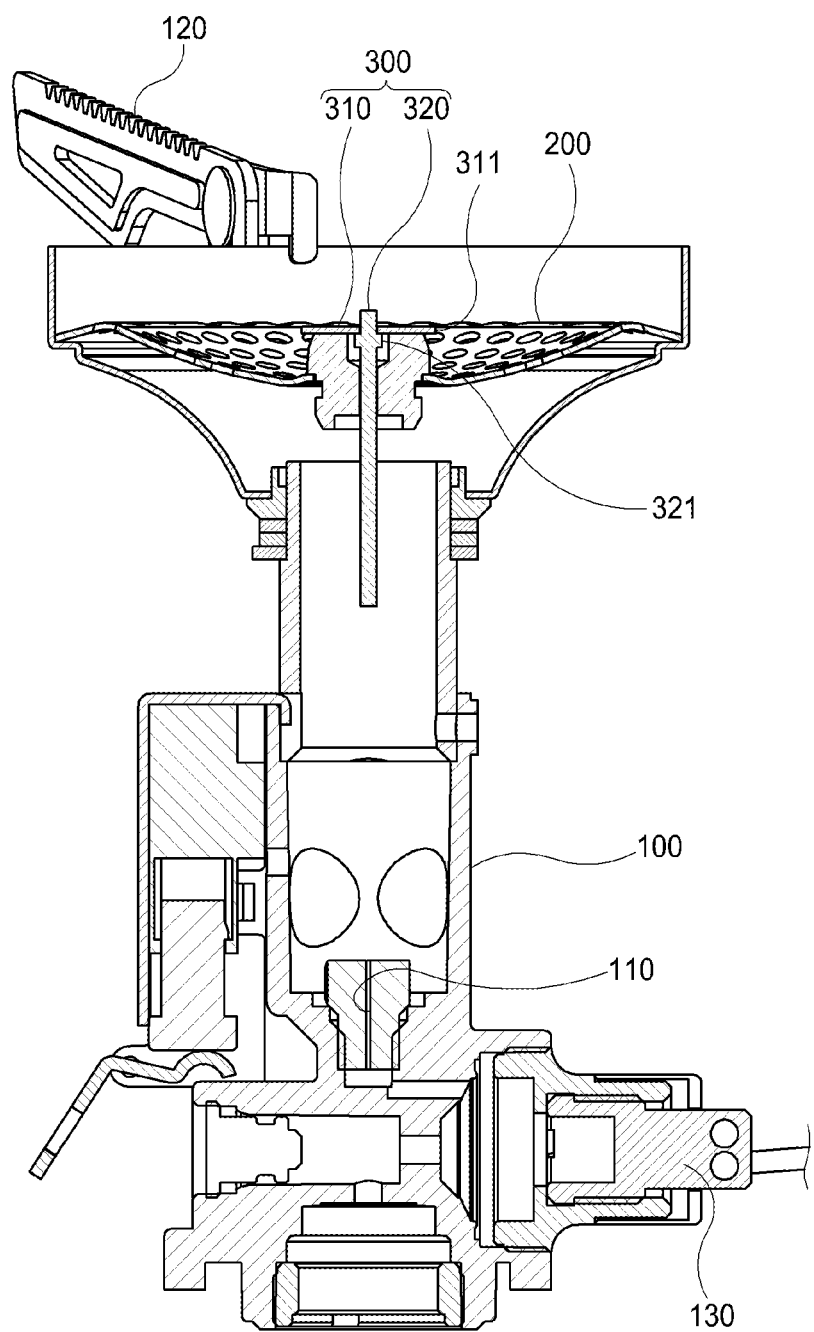
FIG. 3 is a vertical cross-sectional view illustrating the structure of the ignition device of the burner of FIG. 2.
Figure 4:
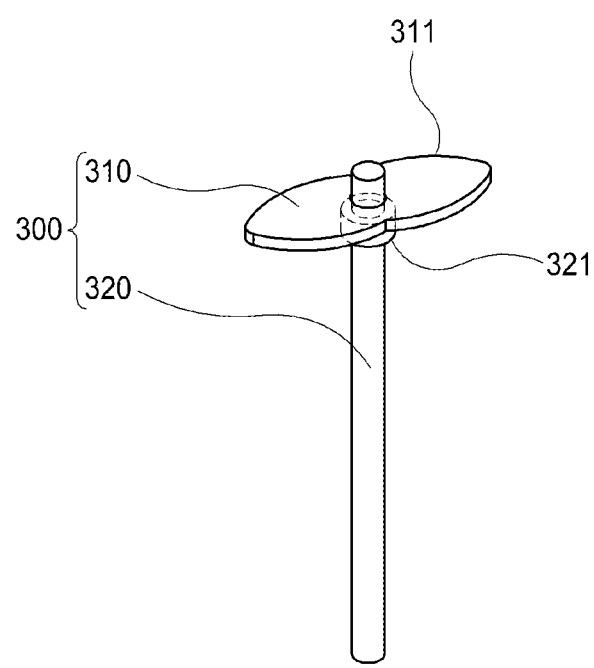
FIG. 4 is a perspective view illustrating a structure of an ignition device of a burner in accordance with an exemplary embodiment.
Figure 5:
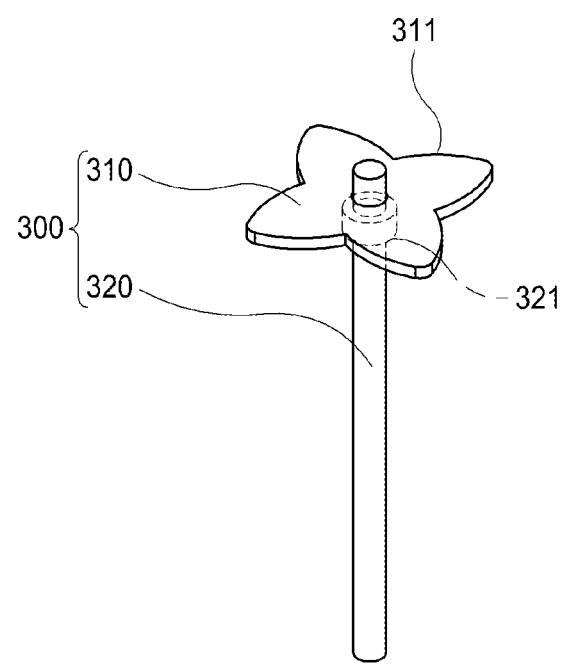
FIG. 5 is a perspective view illustrating a structure of an ignition device of a burner in accordance with another exemplary embodiment.

FIG. 2 is a perspective view illustrating a structure of an ignition device of a burner in accordance with an exemplary embodiment, FIG. 3 is a vertical cross-sectional view illustrating the structure of the ignition device of FIG. 2, FIG. 4 is a perspective view illustrating a structure of an ignition device of a burner in accordance with an exemplary embodiment, and FIG. 5 is a perspective view illustrating a structure of an ignition device of a burner in accordance with another exemplary embodiment.

As illustrated in the drawings, an ignition device 300 of a burner in accordance with an exemplary embodiment includes: a body part 100 having a fuel container coupled to one side thereof and a gas supply flow passage 110 which is formed therein and through which gas contained in the fuel container is supplied; and a burner head 200 which is disposed in an upper central portion of the body part 100 and provides heating power by ejecting a gas supplied thereto from the fuel container through the gas supply flow passage, wherein the ignition device 300 is configured to include: a plate-shaped sparker 310 disposed in an upper central region of the burner head so as to realize ignition to burn the gas ejected from the burner head and having a plurality of ignition portions 311 formed therein; and a supporting members 320 which has one end connected in a center of the sparker 310 and the other end connected in a central region of the burner head 200 such that the sparker 310 is disposed in the upper central region of the burner head 200.

The body part 100 is formed of a cylindrical member with a certain height, a fuel container is coupled to one side thereof such that a gas which is a fuel may be supplied to the side of the burner head 200, and the burner head 200 from which the fuel supplied from the fuel container is ejected is provided on the upper stage thereof.

On the upper stage peripheral portions of the body part 100, support members 120 which are installed in a rotable and foldable manner so as to support a container such as a pan or a kettle which is an object to be heated.

In addition, on an outer surface of the body part 100 corresponding to an outer surface to which the fuel container is coupled, a separate adjusting knob 130 capable of adjusting the amount of gas supplied to the side of the burner head 200 is installed.

The gas supply flow passage 110 which serves as a passage for supplying the gas contained in the fuel container to the side of the burner head 200 is formed in the body part 100.

On the upper stage of the body part 100 to which the burner head 200 is coupled, an air mixing member 140 which is provided in a shape surrounding the burner head 200 and allows the gas supplied to the side of the burner head 200 to be mixed with air during combustion.

The burner head 200 is installed on the upper stage of the body part 100 and functions to receive gas through the gas supply flow passage 110 provided in the body part 100, burn the gas, and apply heat to the side of an object to be heated.

The burner head 200 has a plurality of combustion holes which is uniformly formed on the plate surface to pass through the plate surface so that burnt flame may be uniformly generated over the entire are of the burner head 200.

An ignition member 300 is a member which serves to ignite gas such that the gas contained in the fuel container and supplied to the side of the burner head 200 may be burnt, and which is disposed in the central region of the burner head 200 such that the ignition of the burner may start at the center of the burner head 200 and may be sequentially spread to the peripheral side.

The ignition member 300, as described above, is roughly composed of the sparker 310 and the support member 320 which allows the sparker 310 to be disposed in the center of the burner head 200.

The sparker 310, as illustrated in FIG. 4, is formed to have rugby ball-like shape which are provided at both end portions so that ignition portions 311 correspond to each other and the side surface thereof may be inwardly recessed in a curve toward the center of the sparker 310.

Since the sparker 310 is formed in a plate shape, the stiffness thereof is greater than that of the sparker 10 in the conventional ignition devices which is formed in a bar-shape. Therefore, there is an effect in that even when an external force of the same degree is applied, the sparker 310 of the ignition device of a burner in accordance with an exemplary embodiment is not broken, and consequently, the durability of a produce is improved.

In addition, since the ignition portions 311 of the sparker 310 form which a flame is generated for ignition are formed on both end portions of the sparker formed in a plate shape, there is an effect in that even when any one ignition portion 311 is damaged due to an external force or foreign substances are attached, a flame is generated from another ignition portion 311, and therefore, a stable ignition may be realized.

In addition, since a side central portion of the sparker 310 is formed to be inwardly recessed in a curve toward the center of the sparker 310, there is an effect in that the amount of metal material used for manufacturing the sparker 310 may be reduced to thereby reduce costs.

The sparker 310, as illustrated in FIG. 5, is formed such that the ignition portions 311 are formed in "+"-shapes provided on end portions thereof in four directions so as to correspond to each other, and the side surface thereof may also be formed to be curved convex outward.

Since the sparker 310 is similarly formed also in a plate shape, the stiffness thereof is greater than that of the sparker 10 in the conventional ignition devices which is formed in a bar-shape. Therefore, there is an effect in that even when an external force of the same degree is applied, the sparker 310 of the ignition device of a burner in accordance with an exemplary embodiment is not broken, and consequently, the durability of a produce is improved.

In addition, since the ignition portions 311 of the sparker 310 from which flame is generated for ignition are formed on end portions of the sparker 310 which are formed in a plate shape, there is an effect in that even when any one ignition portion 311 is damaged due to an external force or foreign substances are attached, flame is generated from the other remaining ignition portion 311, and therefore, a stable ignition may be realized.

On the upper outer surface of the support member 320, a stopper 321 which allows the lower surface of the sparker 310 inserted in the support member 320 to be stopped and supported, protrudes in the radial direction of the support member 320.

The process of allowing a burner to ignite by using an ignition device having the above-mentioned configuration in accordance with an exemplary embodiment will be described as follows.

First, a user inserts a fuel container in one side of a body part 100 to couple the body part 100 and the container, and then adjusts an adjusting knob 130 to appropriately adjust the amount of gas supplied from the fuel container to the side of a burner head 200.

In this state, when an ignition device 300 is operated for ignition, flame is generated from ignition portions 311 provided on end portions of a sparker 310, and gas is thereby burnt and a heat source is generated. Thus, the user may use the burner.

The above-mentioned features are merely a description about a portion of exemplary embodiments which may be implemented by the present invention. Therefore, as is well known, the scope of the present invention should not be construed to be limited to the above embodiments, and all technical concepts based on the same root as the technical concept of the present invention should be considered to be included in the scope of the present invention.

What is claimed is:

1. An ignition device (300) of a burner comprising:
   a body part (100) having a fuel container coupled to one side thereof and a gas supply flow passage (110) which is formed therein and through which gas contained in the fuel container is supplied; and
   a burner head (200) which is disposed in an upper central portion of the body part (100) and provides heating power by ejecting a gas supplied thereto from the fuel container through the gas supply flow passage,
   wherein the ignition device (300) comprises:
   a plate-shaped sparker (310) disposed in an upper central region of the burner head (200) and having two or more ignition portions (311) formed therein so as to realize ignition to burn the gas ejected from the burner head (200), wherein the plate-shape sparker (310) extends along an upper surface of the burner head (200); and
   a supporting member (320) which has one end connected in a center of the plate-shaped sparker (310) and the other end connected in a central region of the burner head (200) such that the plate-shaped sparker (310) is disposed in the upper central region of the burner head (200), wherein the two or more ignition portions (311) are symmetrically disposed about the supporting member (320) and extend along the upper surface of the burner head (200).

2. The ignition device of claim 1, wherein a stopper (321) is protruded in a radial direction from an upper outer surface of the supporting member (320) to support a lower surface of the plate-shape sparker inserted in the supporting member (320).

3. The ignition device of claim 1, wherein the two or more ignition portions (311) include: two ignition portions forming a rugby ball-shaped ignition portion, of which central side portion is inwardly recessed toward a center of the plate-shape sparker (310).

4. The ignition device of claim 1, wherein the two or more ignition portions (311) include: four ignition portions forming a "+"-shape ignition portion, and a side surface of each of the four ignition portions is formed to be convexly curved.

* * * * *